(12) United States Patent
Panda et al.

(10) Patent No.: US 9,131,401 B2
(45) Date of Patent: *Sep. 8, 2015

(54) LOAD-BALANCED NSAPI ALLOCATION FOR IWLAN

(71) Applicant: CISCO TECHNOLOGY, INC., San Jose, CA (US)

(72) Inventors: Biswaranjan Panda, Santa Clara, CA (US); Kevin D. Shatzkamer, Hingham, MA (US); Mark Grayson, Maidenhead (GB); Richard Kyle Forster, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/904,925

(22) Filed: May 29, 2013

(65) Prior Publication Data

US 2013/0279337 A1 Oct. 24, 2013

Related U.S. Application Data

(63) Continuation of application No. 11/767,419, filed on Jun. 22, 2007, now Pat. No. 8,488,519.

(51) Int. Cl.
*H04W 28/08* (2009.01)
*H04L 12/701* (2013.01)
*H04L 29/08* (2006.01)
*H04W 88/16* (2009.01)

(52) U.S. Cl.
CPC ......... *H04W 28/08* (2013.01); *H04L 29/08153* (2013.01); *H04L 29/08171* (2013.01); *H04L 45/00* (2013.01); *H04L 67/101* (2013.01); *H04L 67/1002* (2013.01); *H04L 67/1004* (2013.01); *H04L 67/1008* (2013.01); *H04L 67/1014* (2013.01); *H04L 67/1036* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 7,093,002 B2 | 8/2006 | Wolff et al. | |
| 7,401,146 B1 | 7/2008 | Menditto et al. | |
| 7,423,962 B2 | 9/2008 | Auterinen | |
| 8,488,519 B2 | 7/2013 | Panda | |

(Continued)

OTHER PUBLICATIONS

Author Unknown, Discussion on Architectural Issues for NSAPI Usage on the GN' Interface, Vodaphone, The Third Generation Partnership Project: Technical Specification Group Services and System Aspects, Meeting 24, Seoul, South Korea, Jun. 10, 2004, Document Id SP-040412, pp. 1-2.*

(Continued)

*Primary Examiner* — Christopher Crutchfield
(74) *Attorney, Agent, or Firm* — Patent Capital Group

(57) ABSTRACT

In one embodiment, a load balancer receives a message from a tunnel termination gateway (TTG) associated with a mobile device. The load balancer may receive messages from a plurality of TTGs. A gateway node in a plurality of gateway nodes in which to send the message is determined. The load balancer then assigns a NSAPI for use by the gateway node. For example, the NSAPI may be associated with a tunnel that is generated between the TTG and GGSN. The load balancer ensures that the assigned NSAPI is not currently in use at the gateway node. Thus, no overlapping of NSAPIs may occur even though the load balancer is processing messages from multiple TTGs for multiple gateway nodes.

22 Claims, 4 Drawing Sheets

(56) References Cited

U.S. PATENT DOCUMENTS

| | | | |
|---|---|---|---|
| 2002/0049842 | A1 | 4/2002 | Huetsch et al. |
| 2003/0065702 | A1* | 4/2003 | Singh et al. ............... 709/105 |
| 2005/0120350 | A1 | 6/2005 | Ni et al. |
| 2005/0163069 | A1 | 7/2005 | Xu et al. |
| 2005/0283829 | A1* | 12/2005 | Zhurakivsky et al. ............ 726/4 |
| 2006/0104262 | A1 | 5/2006 | Kant et al. |
| 2006/0227705 | A1* | 10/2006 | Chandwadkar et al. ...... 370/229 |
| 2007/0127444 | A1 | 6/2007 | Gras et al. |
| 2007/0259661 | A1* | 11/2007 | Hurtta et al. ............... 455/432.1 |
| 2008/0092224 | A1 | 4/2008 | Coulas et al. |
| 2008/0104607 | A1 | 5/2008 | Baker |
| 2008/0107119 | A1 | 5/2008 | Chen et al. |

OTHER PUBLICATIONS

"3rd Generation Partnership Project; Technical Specification Group Services and System Aspects; 3GPP system to Wireless Local Area Network (WLAN) interworking; System description (Release 7)," 3GPP TS 23.234 V7.5.0 (Mar. 2007) Technical Specification, 85 pages, copyright 2007.

Author Unknown; "Discussion on Architectural Issues for NSAPI Usage on the GN' Interface, Vodaphone," The Third Generation Partnership Project: Technical Specification Group Services and System Aspects, Meeting 24, Seoul, South Korea, Jun. 10, 2004, Document ID SP-040412, pp. 1-2.

Cheng, Shin-Ming, et al., "An Intelligent GGSN Dispatching Mechanism for UMTS," Computer Communications, vol. 28, 2005, pp. 947-955, Elsevier, Dec. 9, 2004.

Carstens, Juergen, "APN-based Distribution of PDP Contexts in the GGSN," Siemens AG, IP.com Prior Art Database No. I IPCM0001963 D, Oct. 24, 2003, pp. 1-6, Machine Translation from German.

* cited by examiner

LOAD-BALANCED NSAPI ALLOCATION FOR IWLAN

RELATED APPLICATION

This Application is a continuation (and claims the benefit of priority under 35 U.S.C. §120) of U.S. application Ser. No. 11/767,419, filed Jun. 22, 2007, entitled "LOAD-BALANCED NSAPI ALLOCATION FOR iWLAN," Inventors Biswaranjan Panda, et al. The disclosure of the prior application is considered part of (and is incorporated by reference in) the disclosure of this application.

TECHNICAL FIELD

Particular embodiments generally relate to networking.

BACKGROUND

A packet data gateway (PDG) functionality may be performed using a tunnel termination gateway (TTG) and a gateway GPRS support node (GGSN) as specified in 3GPP TS 23.234 appendix F. In this case, the TTG assigns a network service access point identifier (NSAPI), which is used to identify a General Packet Radio Service (GPRS) tunneling protocol (GTP) tunnel between the TTG and GGSN. This is different from previous processes where the mobile device assigned the NSAPI. In the 3GPP TS 23.234 appendix F architecture, a single TTG is associated with a single GGSN.

The problem with using a one-to-one mapping between a TTG and GGSN is that scalability is not provided. For example, when multiple GGSNs are being used, the load at one GGSN may be more than another GGSN, which may cause an overloaded GGSN to end a session even when another GGSN has available resources. However, because of the one-to-one mapping, a TTG cannot send messages to the underutilized GGSN. Rather, the overloaded GGSN still must be used.

To increase scalability, load balancing may be used to spread use of GGSN resources to underutilized GGSNs. However, because the TTG assigns the NSAPI, it is possible that the same NSAPI may be sent to the same GGSN by different TTGs. In this case, a tunnel may already be associated with the NSAPI. Then, a second TTG may assign the same NSAPI to a new tunnel for the same GGSN. In this case, the GGSN will tear down the first tunnel and initiate a new tunnel using the new NSAPI. This may end an active session prematurely.

DESCRIPTION OF EXAMPLE EMBODIMENTS

Overview

In one embodiment, a load balancer receives a message from a tunnel termination gateway (TTG) associated with a mobile device. The load balancer may receive messages from a plurality of TTGs. A gateway node in a plurality of gateway nodes in which to send the message is determined. The load balancer then assigns a NSAPI for use by the gateway node. For example, the NSAPI may be associated with a tunnel that is generated between the TTG and GGSN. The load balancer ensures that the assigned NSAPI is not currently in use at the gateway node. Thus, no overlapping of NSAPIs may occur even though the load balancer is processing messages from multiple TTGs for multiple gateway nodes.

In one embodiment, a method is disclosed. The method includes receiving at a load balancer a message from a TTG for a device, where the message is to be used to create a tunnel, the load balancer determining a first gateway node in a plurality of nodes to which to send the message, the load balancer accessing a plurality of mappings between a plurality of NSAPIs and the plurality of nodes, the load balancer determining whether a particular NSAPI of the plurality of NSAPIs is currently in use at the first gateway node, the load balancer assigning the particular NSAPI for use by the first gateway node, and the load balancer sending the message to the first gateway node.

Example Embodiments

Figure 1:
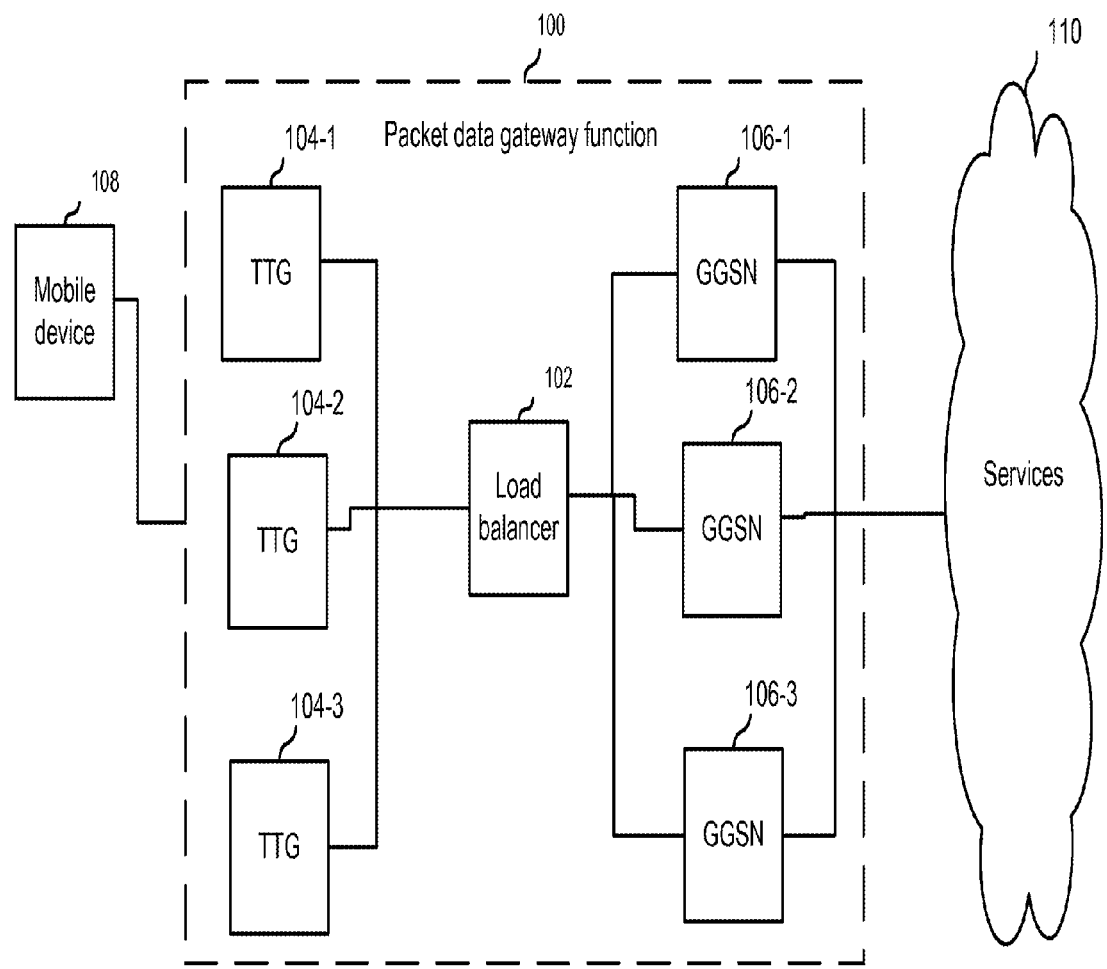
FIG. 1 depicts an example of a system for providing NSAPI allocation.

FIG. 1 depicts an example of a system for providing NSAPI allocation. As shown, the system includes a load balancer 102, a plurality of TTGs 104, a plurality of GGSNs 106, a mobile device 108, and data services 110.

TTG 104 and GGSN 106 provide a packet gateway functionality 100 for the system. The packet data gateway functionality allows mobile device 108 to access data services 110 in a wireless local area network (WLAN), such as a wireless fidelity (WiFi). In WLAN, a packet data gateway may be used. However, legacy carriers may use existing network devices, such as the GGSN to implement the packet data gateway functionality. The packet data gateway functionality is responsible for securing the traffic coming over the WLAN, assigning IP addresses, authenticating users and services, generating accounting information, and applying QoS policies.

Mobile device 108 may be any suitable mobile device. For example, mobile device 108 may include a cellular telephone, laptop computer, personal digital assistant (PDA), personal e-mail device, etc. Mobile device 108 may access TTG 104 through an access network 112. Access network 112 may include a wireless local area network (WLAN), or other mobile communications system. Although a WLAN is described, it will be understood that any suitable wireless network may be used.

TTG 104 is a device that provides a tunnel between mobile device 108 and itself. In one embodiment, the tunnel may be an IPSec tunnel. TTG 104 provides termination of the tunnel with mobile device 108.

GGSN 106 is configured to communicate with data services 110. GGSN allows service providers to provide data services to mobile device 108. GGSN 106 provides a gateway to data services 110. A gateway GPRS support node (GGSN) acts as an interface between the GPRS backbone network and the external packet data networks (radio network and the IP network).

In one embodiment, a tunnel, such as a GTP tunnel, is created between TTG 104 and GGSN 106. Although a tunnel is described, it will be understood that any connection may be used between TTG 104 and GGSN 106. GGSN 106 identifies the GTP tunnel using an NSAPI that is assigned. Thus, communications from data services 110 may include the NSAPI and GGSN 114 uses the NSAPI to determine which tunnel the messages should be sent through. Also, TTG 104 may use the NSAPI to send messages to GGSN 106 through the correct tunnel.

Load balancer 102 may receive a packet data protocol (PDP) context create message, which is a message to create a tunnel, from TTG 104. Load balancer 102 then dynamically assigns an NSAPI for the PDP context create message. This message is then sent to GGSN 106, which can then create a tunnel between TTG 104 and GGSN 106. It should be noted that any protocol may be used to create a tunnel and creating a tunnel is known in the art.

As discussed in the background, the TTG conventionally assigned the NSAPI. If multiple TTGs assigned NSAPIs independently, it is possible they may assign the same NSAPI for identifying different tunnels to the same GGSN. This results in the tearing down of an existing tunnel with the same NSAPI. This is undesirable in that the two NSAPIs are probably associated with different mobile devices that have initiated different sessions. Because the same NSAPI has been allocated for the tunnels, only one tunnel can be active.

However, particular embodiments allow load balancer 102 to determine NSAPIs for tunnels. Load balancer 102 is a central point for receiving tunnel create requests from TTGs 104 and can assign and keep track of which NSAPIs were assigned to which GGSNs 106. Thus, load balancer 102 can determine which GGSNs 106 have had which NSAPIs assigned. Then, when an NSAPI is determined, load balancer 102 ensures that the NSAPIs do not overlap for a specific GGSN 106.

Figure 2:
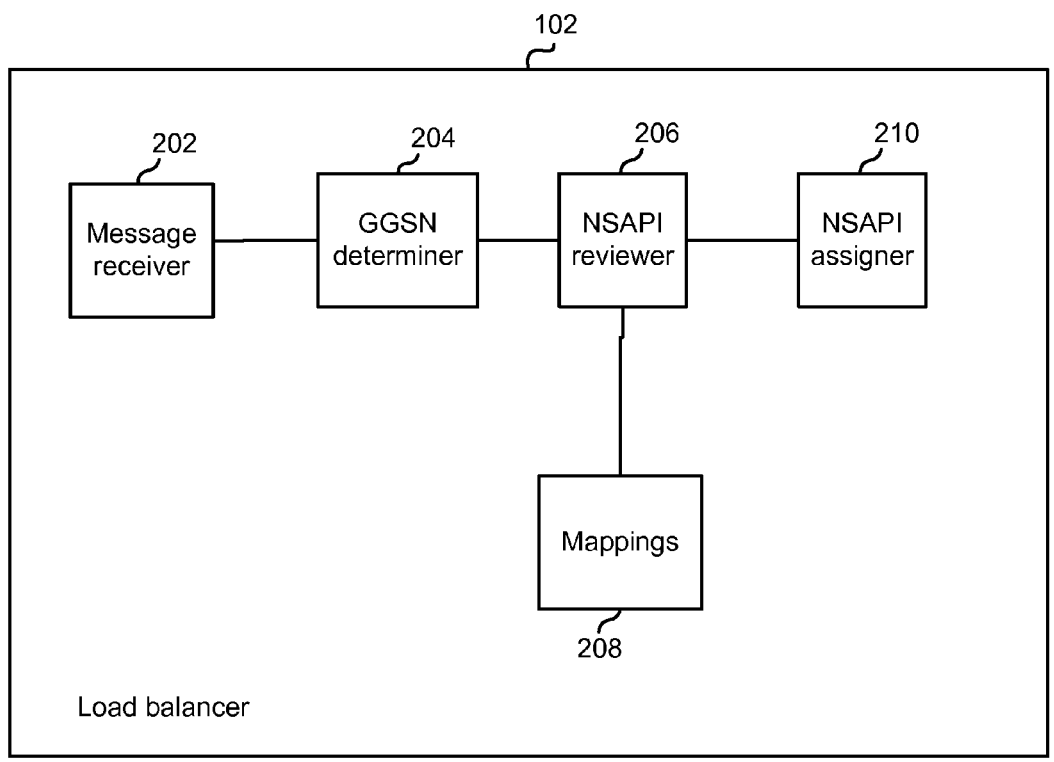
FIG. 2 depicts a more detailed example of a load balancer.

FIG. 2 depicts a more detailed example of load balancer 102. As shown, a message receiver 202, a GGSN determiner 204, an NSAPI reviewer 206, mappings 208, and an NSAPI assigner 210 are provided.

Message receiver 202 is configured to receive a message from TTG 104. For example, the message received may be an access request from mobile device 108. When the message is received, a tunnel may need to be created between TTG 104 and GGSN 114.

The message from TTG 104 may or may not include an assigned NSAPI. For example, TTG 104 may be configured such that an NSAPI is not assigned when an access request is received because load balancer 102 assigns them. However, to conform to prior specifications, TTG 104 may be allowed to assign an NSAPI but this NSAPI may be overwritten by load balancer 102 to ensure no overlapping at GGSNs 114.

GGSN determiner 204 determines a GGSN to send the access request to. For example, any load balancing techniques may be used to determine which GGSN 106 should be assigned the access request. In one example, the GGSN that has available resources is determined to service the access request. Also, network bandwidth, cost, and other factors may be taken into account in determining the GGSN.

NSAPI reviewer 206 is configured to determine NSAPIs that have already been assigned at the determined GGSN 106. For example, mappings 208 are maintained for each GGSN and include an NSAPI to tunnel mapping. A table look-up may be performed to determine which NSAPIs have already been assigned. Also, sequence numbers may be used where NSAPIs below a certain threshold have already been assigned. The NSAPI is then assigned a value that is not active at a specific GGSN 106. This allows NSAPI reviewer 206 to determine which NSAPIs have already been assigned for a specific GGSN 106. The mappings may also identify which mobile device 108 is associated with the NSAPI, which may allow for call continuity to be provided as will be described later.

NSAPI assigner 210 then determines a unique NSAPI for the determined GGSN 106. In one embodiment, NSAPI assigner 210 may generate a new NSAPI for the access request. Also, if an NSAPI was assigned by TTG 104, the NSAPI may be overwritten. However, if the NSAPI assigned by TTG 104 is not in use at the determined GGSN 106, then the NSAPI assigned by TTG 104 may be used.

Figure 3:
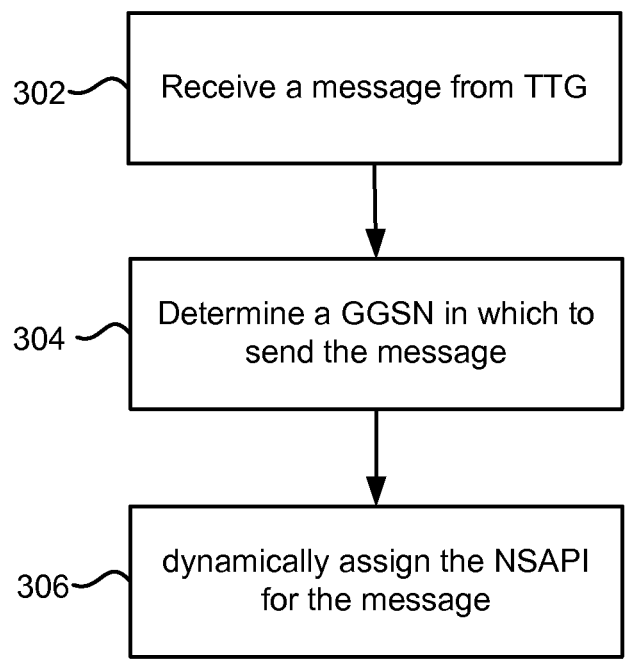
FIG. 3 depicts an example of a method for assigning NSAPIs.

FIG. 3 depicts an example of a method for assigning NSAPIs. Step 302 receives a message from TTG 104. The message may be for creating a tunnel.

Step 304 determines a GGSN 106 in which to send the message. For example, load balancer 102 may determine an appropriate GGSN 106 to handle the request.

Step 306 then dynamically assigns the NSAPI for the message. For example, an NSAPI that is unique to the determined GGSN 106 is assigned.

Figure 4:
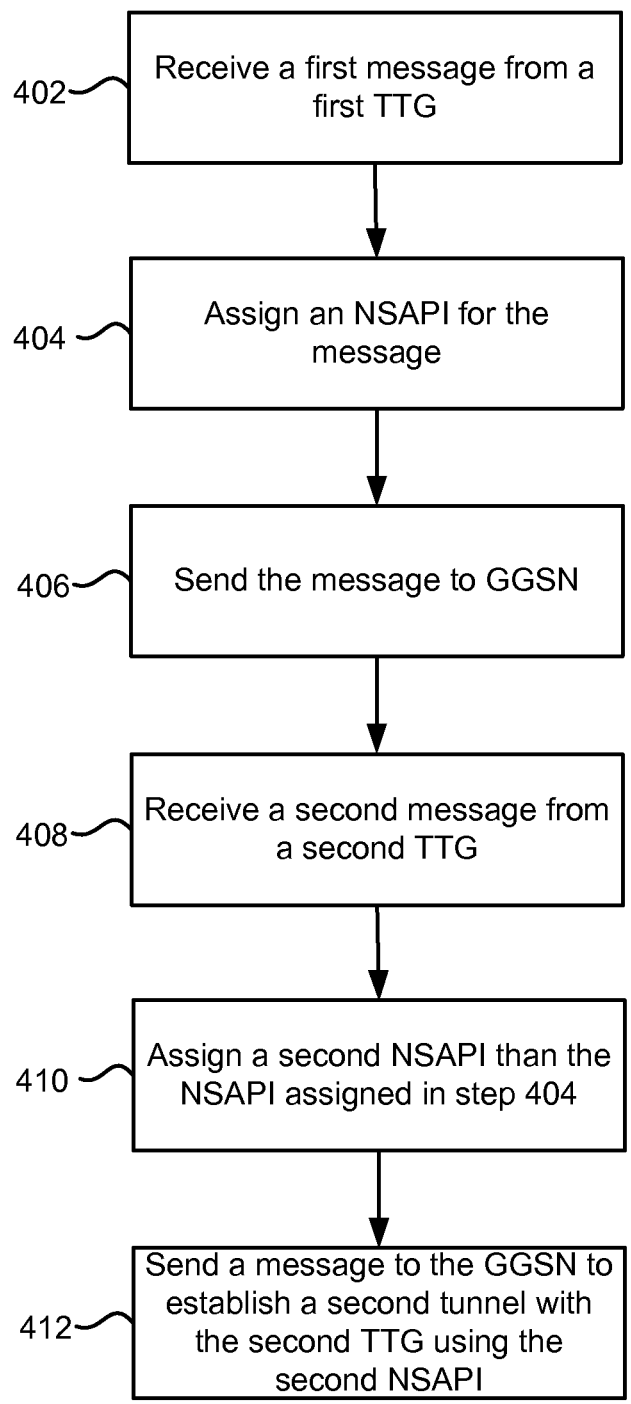
FIG. 4 depicts a more detailed example of a method for assigning NSAPIs.

FIG. 4 depicts a more detailed example of a method for assigning NSAPIs. Because of the existence of multiple TTGs, load balancer 102 may process requests from different TTGs that may go to the same GGSN 106.

Step 402 receives a first message from a first TTG 104. The first message may be for a first mobile device 108-1.

Step 404 assigns an NSAPI for the message. This NSAPI is a value that is unique to a first GGSN 106-1.

Step 406 sends the message to GGSN 106-1. GGSN 106-1 may then establish a tunnel with TTG 104-1.

Step 408 receives a second message from a second TTG 104-2. This message may be for a second mobile device.

Step 410 assigns a second NSAPI than the NSAPI assigned in step 404. This is because the second message is going to be sent to the same GGSN 106-1.

Step 412 then sends a message to GGSN 106-1 and GGSN 106-1 can then establish a second tunnel with TTG 104-2 using the second NSAPI. Accordingly, load balancer 102 assures that the NSAPIs assigned do not overlap.

Particular embodiments may be used to provide call continuity. For example, a mobile device may start a call using a first access network. The call is connected through a first TTG 104-1 and GGSN 106-1. During the call, mobile device 108 may attach to a different access network. For example, mobile device 108 may roam and attach to a WiFi network. The WiFi network may send an access request to a second TTG 104-2. When a second message is received from a second TTG 104-2, load balancer 102 may determine it is for mobile device 108. Load balancer 102 may determine the call is for the mobile device because an identifier, such as an IP address, may be the same. Accordingly, it can determine that it should be sent to the same GGSN 106-1. However, to avoid tearing down the original tunnel, a different NSAPI may be assigned. Then, a tunnel may be brought up between GGSN 106-1 and TTG 104-2. The call may be handed off and then the first tunnel is torn down. The call continues using the tunnel between TTG 104-2 and GGSN 106-1, however. Accordingly, call continuity may be provided using load balancer 102.

Particular embodiments provide many advantages. For example, load balancer 102 allows scalability in using multiple TTGs 104 and GGSNs 106. Accordingly, GGSN resources may be optimally used. Also, load balancer 102 ensures that NSAPIs assigned to tunnels are unique and thus unnecessary tearing down of tunnels because of overlapping NSAPIs does not occur.

Although the description has been described with respect to particular embodiments thereof, these particular embodiments are merely illustrative, and not restrictive. Although an NSAPI is described, it will be understood that the NSAPI may be any identifier that could overlap at the GGSN. For example, the NSAPI may be other tunnel identifiers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method, comprising:
   receiving at a load balancer a message from a tunnel termination gateway (TTG) for a device, wherein the message is to be used to create a tunnel;
   the load balancer determining a first gateway node in a plurality of nodes to which to send the message;
   the load balancer accessing a plurality of mappings between a plurality of network service access point identifiers (NSAPIs) and the plurality of nodes;
   the load balancer determining whether a particular NSAPI of the plurality of NSAPIs is currently in use at the first gateway node;
   the load balancer assigning the particular NSAPI for use by the first gateway node; and
   the load balancer sending the message to the first gateway node.

2. The method of claim 1, wherein the message comprises a packet data protocol (PDP) context create message.

3. The method of claim 2, wherein the assigning comprises dynamically assigning the particular NSAPI for the PDP context create message.

4. The method of claim 1, wherein the message comprises an access request associated with a mobile device.

5. The method of claim 1, wherein the assigning includes overwriting an existing NSAPI provided in the message with the particular NSAPI.

6. The method of claim 1, wherein the determining includes employing a load-balancing technique that evaluates available resources for servicing the message.

7. The method of claim 1, wherein the assigning includes assigning a value that is not active at the first gateway node.

8. The method of claim 1, wherein the accessing includes identifying one or more mobile devices that are associated with one or more NSAPIs.

9. The method of claim 1, further comprising:
   determining that a particular call involves a mobile device; and
   sending a particular message to a same network node that was previously associated with the mobile device.

10. The method of claim 1, wherein the load balancer assigning the particular NSAPI for use by the first gateway node occurs when the load balancer determined that the particular NSAPI is not currently in use at the first gateway node.

11. A load balancer, comprising:
    a processor; and
    a non-transitory computer readable media, wherein the load balancer is configured for:
        receiving, from a tunnel termination gateway (TTG), a message for a device, wherein the message is to be used to create a tunnel;
        determining a first gateway node in a plurality of nodes to which to send the message;
        accessing a plurality of mappings between a plurality of identifiers and the plurality of nodes;
        determining whether a particular identifier of the plurality of identifiers is currently in use at the first gateway node;
        assigning the particular identifier for use by the first gateway node; and
        sending the message to the first gateway node.

12. The load balancer of claim 11, wherein the message comprises a packet data protocol (PDP) context create message.

13. The load balancer of claim 12, wherein the assigning comprises dynamically assigning the particular identifier for the PDP context create message.

14. The load balancer of claim 11, wherein the message comprises an access request associated with a mobile device.

15. The load balancer of claim 11, wherein the assigning includes overwriting an existing identifier provided in the message with the particular identifier.

16. The load balancer of claim 11, wherein the determining includes employing a load-balancing technique that evaluates available resources for servicing the message.

17. The load balancer of claim 11, wherein the assigning includes assigning a value that is not active at the first gateway node.

18. The load balancer of claim 11, wherein the accessing includes identifying one or more mobile devices that are associated with one or more identifiers.

19. The load balancer of claim 11, the load balancer being further configured for:
    determining that a particular call involves a mobile device; and
    sending a particular message to a same network node that was previously associated with the mobile device.

20. The load balancer of claim 11, wherein the load balancer further comprises:
    a message receiver element;
    a determiner element;
    an identifier reviewer element; and
    an identifier assigner element.

21. The load balancer of claim 11, wherein the load balancer is configured to assign the particular identifier for use by the first gateway node if the load balancer determined that the particular identifier is not currently in use at the first gateway node.

22. The load balancer of claim 11, wherein the plurality of identifiers comprises a plurality of network service access point identifiers (NSAPIs).

* * * * *